United States Patent [19]
Ricks et al.

[11] Patent Number: 5,678,850
[45] Date of Patent: Oct. 21, 1997

[54] COVER MOUNTING ARRANGEMENT FOR AIRBAG MODULE

[75] Inventors: Merle K. Ricks, Layton; Janiel Sorenson, Salt Lake City, both of Utah

[73] Assignee: Morton International, Inc., Chicago, Ill.

[21] Appl. No.: 693,651

[22] Filed: Aug. 9, 1996

[51] Int. Cl.$^6$ ................................................. B60R 21/20
[52] U.S. Cl. ........................................ 280/728.2; 280/728.3
[58] Field of Search ........................... 280/728.3, 728.2, 280/731, 732, 730.1, 728.1

[56] References Cited

U.S. PATENT DOCUMENTS

| | | | |
|---|---|---|---|
| 5,186,490 | 2/1993 | Adams et al. | 280/728.3 |
| 5,280,946 | 1/1994 | Adams et al. | 280/728.2 |
| 5,505,483 | 4/1996 | Taguchi et al. | 280/728.3 |
| 5,520,409 | 5/1996 | Saderholm | 280/728.2 |
| 5,577,768 | 11/1996 | Taguchi et al. | 280/728.2 |

FOREIGN PATENT DOCUMENTS 1-160756  6/1989  Japan ................................. 280/728.2

*Primary Examiner*—Peter C. English
*Attorney, Agent, or Firm*—Taylor J. Ross; Gerald K. White

[57] ABSTRACT

An airbag module cover mounting arrangement. The module includes an inflator having a cushion mounted thereto. A cover partially surrounds and protects the cushion and inflator, and includes a decorative main panel and a hidden skirt. The skirt includes a plurality of mounting flaps extending therefrom. An inflator bracket is retained by the flaps, with the inflator held between the bracket and the cover main panel. A mounting flange is placed over the mounting bracket, and the flange includes flap hooks which hold the cover flaps in the mounted position, locked together with the inflator bracket. The flap hooks and mounting flaps include mating angled sections which force the flaps further into the locked position by camming action during normal assembly.

21 Claims, 3 Drawing Sheets

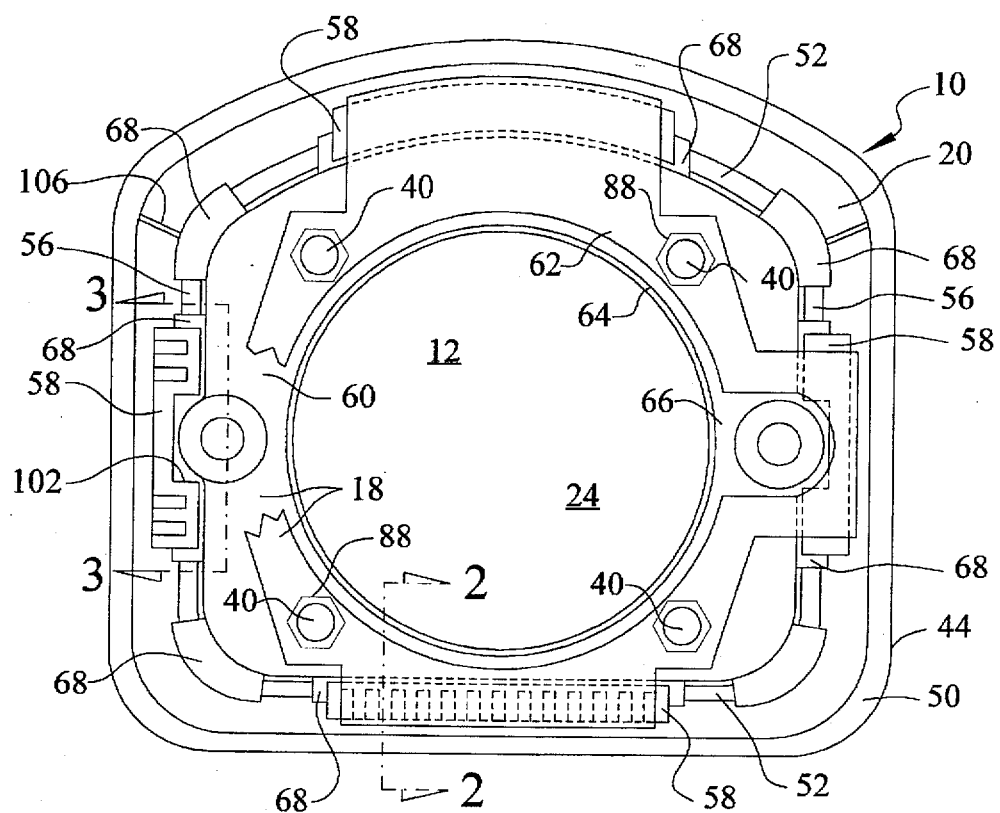
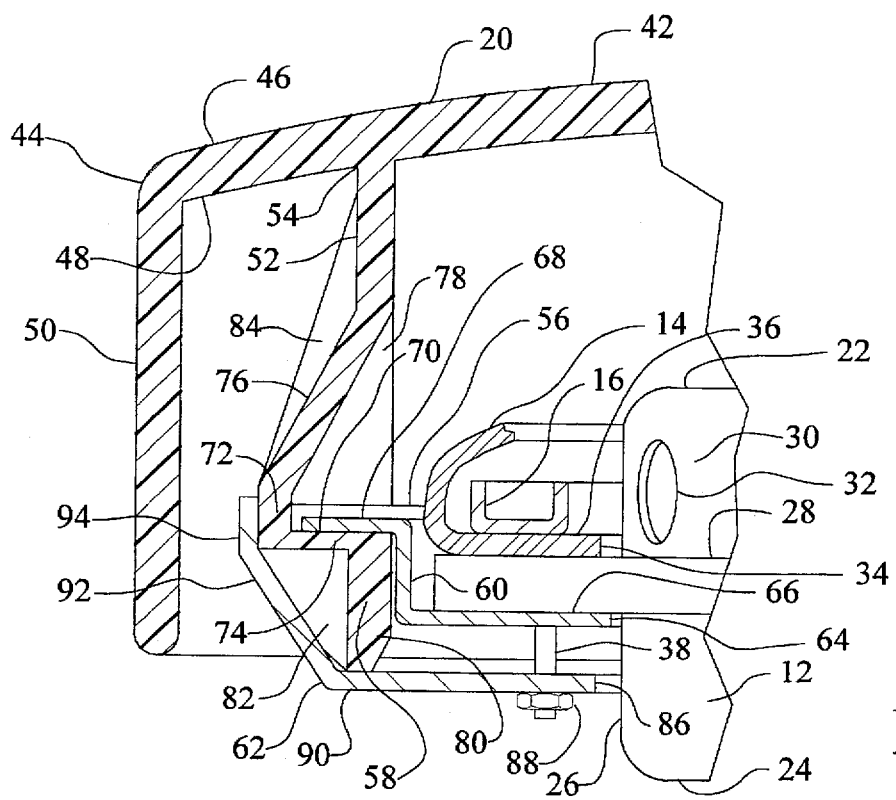
Fig. 1
Fig. 2

COVER MOUNTING ARRANGEMENT FOR AIRBAG MODULE

BACKGROUND OF THE INVENTION

1. Field of the Invention

The present invention relates in general to airbag passive restraint modules and their protective covers. In particular, the present invention relates to an airbag module having an improved arrangement for securing a cover of the module.

2. Description of the Related Art

Airbag passive restraint systems are increasingly common in contemporary vehicles. Such systems typically include an inflator for producing a quantity of inflation gas upon receipt of a signal indicating a collision. The inflator is connected to a cushion having the form of a flexible fabric bag. The inflation gas inflates the cushion to a predetermined pressure. To protect the cushion during the (possibly years-long) period before the cushion is deployed, and to improve aesthetics in the vehicle passenger cabin, a cover is mounted over the cushion. These items, when assembled together, are typically referred to as a module.

The mounting of the cover varies appreciably depending upon the location of the airbag module. For example, a module to protect the driver of the vehicle is often mounted within the steering wheel. For this arrangement, the cover will typically include a decorative main panel extending over the various module components, and which may be pressed to activate the horn, etc. From this main panel there are various hidden skirts, flaps, etc. extending downward which are secured to the cushion, inflator, steering wheel armature, etc. to maintain the cover in place.

While this appears simple when stated so broadly, in practice them are several difficult design problems. First, the main panel of the cover includes lines of reduced strength which tear to permit the inflating cushion to reach the passenger. To cause this tearing, however, the inflating cushion presses against the main panel with appreciable force. This force tends to push the cover away from the steering wheel and toward the driver. As such, the attachment of the cushion must be sufficiently strong to resist this force. This is a critical feature, since if the attachment failed the entire cover would be propelled toward the driver's face, possibly causing injury.

A second design consideration is ease of manufacture. The covers, with the decorative main panel and hidden skirts, flaps, etc., are preferably molded as one piece to reduce cost. During this molding, it has been common to use two mold halves which separate in a direction normal to the main panel. If the flaps or skirt include undercut areas (forming a shoulder facing the main panel), the undercuts oppose parting of the mold halves. Even if the mold half forming the undercut is provided with movable sections to withdraw from the undercut, parting is still a problem. These problems have led to an undesirable amount of scrap in the molding process for the cover.

A further design consideration is ease of assembly. An appreciable portion of the cost of an airbag module is assembly labor. Providing a cover which is easily and quickly mounted is therefore critical to a commercially successful module.

SUMMARY OF THE INVENTION

An object of the present invention is to provide an airbag module which provides a safe and reliable passive restraint for the passenger.

Another object of the present invention is to provide such a module, which reduces the material, assembly and mounting costs for the module.

A further object of the present invention is to provide such a module in which the cover has a form which increases the ease of molding, to reduce scrap rates.

Another object of the present invention is to provide a mounting arrangement for the cover which is easy to assemble.

Yet another object of the present invention is to provide a mounting arrangement for the cover which increases the retention force on the cover.

These and other objects are achieved by an airbag module cover mounting arrangement. The module includes an inflator having a cushion mounted thereto. A cover partially surrounds and protects the cushion and inflator, and includes a decorative main panel and a hidden skirt. The skirt includes a plurality of mounting flaps extending therefrom. An inflator bracket is retained by the flaps, with the inflator held between the bracket and the cover main panel. A mounting flange is placed over the mounting bracket, and the flange includes flap hooks which hold the cover flaps in the mounted position, locked together with the inflator bracket. The flap hooks and mounting flaps include mating angled sections which force the flaps further into the locked position by camming action during normal assembly.

BRIEF DESCRIPTION OF THE DRAWINGS

The objects and features of the invention noted above are explained in more detail with reference to the drawings, in which like reference numerals denote like elements, and in which:

FIG. 1 is a rear view, with partial cut-away, of a module according to the present invention;

FIG. 2 is a cross-sectional view along line 2—2 of FIG. 1, with portions removed for clarity;

DETAILED DESCRIPTION OF THE INVENTION

Figure 3:
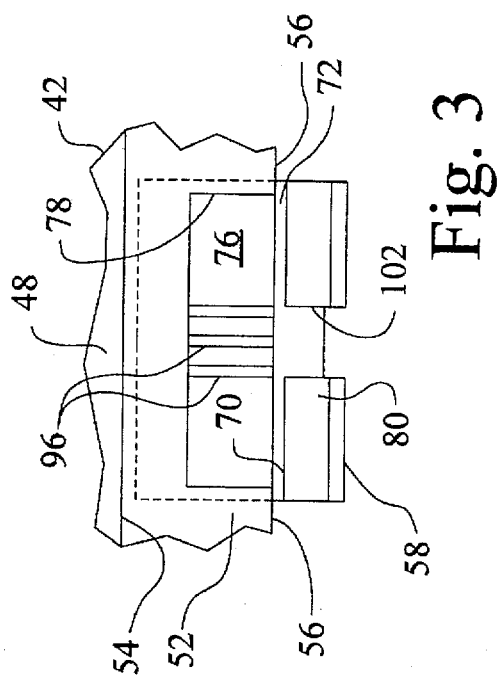
FIG. 3 is a side view of a flap along line 3—3 of FIG. 1, with portions removed for clarity.

With reference to FIG. 1, a module according to the present invention is generally designated by reference numeral 10. In the embodiment shown, the module is of a type typically associated with a driver side placement, for mounting to a steering wheel (not shown) of a vehicle. While the description will be made with reference to this embodiment, those skilled in the art will readily recognize the possible application to modules typically mounted in other locations.

The module 10 is formed of several major components, which include an inflator 12, a cushion 14, a retaining member 16, a mounting assembly 18, and a cover 20. These module components, after assembly described below, will be secured to appropriate mounting brackets (not shown) on the steering wheel of the vehicle. The details of these components will now be described.

In the embodiment shown, the inflator 12 is of the type commonly used for driver side placement, and in particular, the type commonly mounted within the central section of the steering wheel. The inflator 12 will typically have the general shape of a disk, with the longitudinal axis being pointed generally toward the driver when installed in the vehicle. This longitudinal axis is further referenced as the longitudinal axis for the entire module. In keeping with the general disk shape, the inflator 12 includes an outer housing best shown in FIG. 2, and which includes a circular top wall 22, a circular bottom wall 24 spaced from the top wall, and a tubular side wall 26 extending between the peripheries of the top and bottom walls. Intermediate the top and bottom walls, a peripheral inflator flange 28 extends radially outward from the side wall 26. The flange 28 includes a plurality of angularly spaced flange holes (not shown) extending therethrough.

While not shown, the inflator will include a mass of gas generant material which will produce a quantity of inflation gas upon activation of an appropriate element, typically referred to as a squib. The squib will in turn be electrically connected to a collision sensor in order to receive its activation signal. The inflation gas produced within the inflator housing will exit from a diffuser 30 formed by the section of the housing which is above the flange 28. As shown, the diffuser includes a plurality of gas exit ports 32, through which the gas will flow, angularly spaced about the side wall 26. Alternatively, the exit ports could be located in the top wall 22.

The gas from the inflator is of course used to inflate the cushion 14. The cushion is formed of flexible fabric, and includes an inlet opening 34 sized to receive the diffuser. Immediately surrounding the inlet opening there is an inlet peripheral edge 36. Because the gas from the inflator must inflate the cushion in a very rapid manner, the inlet peripheral edge is subjected to relatively large forces, and as such may be reinforced by additional layers of fabric or other means. As best shown in FIG. 2, the inlet peripheral edge rests upon the upper face of the inflator flange 28. The inlet peripheral edge 36 includes a plurality of angularly spaced cushion holes (not shown) extending therethrough, with the cushion holes being aligned with the flange holes.

The retaining member 16 is located within the cushion, just inside the inlet opening 34, as best shown in FIG. 2. The retaining member has a shape corresponding to, and a size slightly larger than, the inlet opening 34. As such, the retaining member corresponds to and rests upon the peripheral edge 36 of the opening. This results in the peripheral edge 36 being held between the retaining member 16 and the inflator flange 28. As will be made clear below, the retaining member and flange will clamp the peripheral edge 36 to retain the edge in position during storage and deployment of the cushion. To provide adequate clamping force, it is preferred that the retaining member be formed as a closed polygon. In the driver side embodiment shown, the retaining member is thus formed as a ring. To make the retaining member even more rigid, it is preferred that it be formed of metal which has been stamped, forged and/or drawn to have a U-shaped cross-section, as shown.

The retaining member 16 also has a plurality of angularly spaced studs 38 extending downward to free ends 40. The spacing and number of studs 38 corresponds to the spacing and number of flange holes and cushion holes, and the studs extend therethrough. The studs 38 are threaded at least adjacent their free ends, for reasons discussed below.

The module 10 also includes the cover 20. The cover will include a generally planar front face 42 having a peripheral edge 44. For the driver side embodiment shown, the front face would, when finally assembled, be located in the center of the steering wheel. For a passenger side placement, the front face would typically form a section of the vehicle dashboard. The front face 42 further includes an upper surface 46, which will face the driver, and a lower surface 48. A peripheral wall 50 may extend downward from the lower surface 48 along at least a portion of the peripheral edge 44. In addition, a protective skirt 52 extends downward from the lower surface 48.

The skirt 52 is a flexible member having an upper edge 54 secured to the lower surface 48, and a free edge 56. The skirt may advantageously be formed monolithically with the front face 42, as by a plastic molding operation. The skirt extends about at least essentially the entire periphery of the cover, with the upper edge of the skirt located in proximity to the peripheral edge 44 of the front face to define a wall surrounding and aligned with the longitudinal axis, as best shown in FIG. 1. The area enclosed by the skirt has a size and shape to receive the folded cushion 14 and a portion of the inflator 12. It is preferred that the surrounding wall defined by the skirt be as complete as possible, for reasons made clear below.

Formed in the skirt 52 is a plurality of mounting flaps 58. In the embodiment shown, the periphery of the cover has a generally rectangular configuration, and as such, four of the flaps 58, one on each side of this rectangle, are shown. Other numbers of flaps may be employed, as desired. The flaps are preferably formed monolithically with the skirt (and front face), as by a plastic molding operation. As with the skirt, the flaps will be generally flexible.

The flaps, using an arrangement described more fully below, are secured to the mounting assembly 18. The mounting assembly 18 actually consists of two elements: a support plate 60 and a retaining plate 62. The support plate is mounted closest to the front face of the cover, and generally consists of a rigid plate, preferably having a concavity opening toward the front face of the cover. Within this concavity there is a central opening 64 having a size and shape to permit a portion of the inflator 12 to extend therethrough. Surrounding this central opening is an inflator mounting edge 66 upon which the peripheral flange 28 of the inflator rests. The support plate also includes a plurality of stud holes (not shown) aligned with the studs 38 of the retaining member 16, and having the studs extending therethrough. The concavity of the support plate therefore serves to receive the mounting flange and diffuser of the inflator, as well as the lower portion of the cushion.

While the central portion of the support plate may be provided with the concavity shown, at least the peripheral edge of the support plate will extend peripherally outward, to form an abutment surface to rest against the free edge 56 of the skirt 52. The peripheral edge of the support plate corresponds at least generally in shape to the skirt 52, and is preferably of a size to rest upon the free edge of the skirt. In the embodiment shown, the peripheral edge is not continuous about the periphery, but includes a plurality of peripherally spaced cutouts which serve to define a plurality of flanges 68.

The peripheral edge, and if present the flanges 68, of the support plate therefore rests upon the free edge of the skirt. This prevents movement of the support plate 60 toward the front face 42 of the cover. To prevent motion of the support plate in the remaining directions, the flaps 58 will engage portions of the peripheral edge, and in particular associated ones of the flanges, if such flanges are used.

The flaps and peripheral edge may take various forms to provide the desired engagement, with the flaps generally including a surface facing the front face of the cover, and this surface engaging the peripheral edge of the support plate from below. For example, the peripheral edge could be formed by the flanges 68, and the flaps 58 could include slots (not shown) sized to closely receive associated ones of the flanges. The interior face of the slot which is opposed to the front face of the cover would thus form the required surface. Various other arrangements could also be employed.

In the embodiment shown, the surface consists of a shoulder 70, opening peripherally inward, and opposed to the front face of the cover. This shoulder is formed on each of the flaps 58. Specifically, the flaps 58 extend longitudinally outward from the free edge 56 of the skirt 52. Each flap includes a leg portion 72 adjacent to the free edge 56, with the leg portion having a relatively small thickness in the radial direction. Beyond this leg portion 72 toward the free end of the flap is a foot section 74, having a thickness which is much greater. For each of the flaps the foot section extends radially inward. It is the upper face of the foot section which forms the shoulder 70.

In the embodiment shown in FIGS. 2–5, the leg portion 72 is spaced peripherally outward from the free edge 56 of the skirt, such that the radially inner edge of the foot section 74 is approximately aligned with the radially inner face of the skirt. As such, forming the periphery of the support plate, and in particular the flanges 68, with a sufficient size to permit abutment of the support plate against the shoulder 70 will necessarily result in the flanges having a sufficient size to extend over the free edge 56 of the skirt 52. The flanges (and thus the entire support plate 60) will therefore be prevented from moving toward the front face 42 by abutment against the free edge 56, and will be prevented from moving away from the front face by abutment against the shoulders 70. As is apparent from FIG. 2, the flaps 52 also serve to prevent lateral movement of the support plate 60 by abutment of the support plate against the leg portion 72. The support plate is therefore secured to the cover 20 by the skirt 52 and flaps 58. Conversely, since the support plate will be fixed to the steering wheel, the cover 20 is secured to the support plate 60.

As noted, the leg portion 72 is offset peripherally outward from the free edge of the skirt. To connect this leg portion to the skirt, it is preferred that the skirt include a taper portion 76 in the form of a notch in the skirt. Such a taper portion 76 would have a peripheral length approximately equal to that of the associated flap 58, and would connect with the skirt via end panels 78. As may be envisioned, if the tapered portion is longer than the flap, the end panels will be peripherally spaced (not shown) from the flap 58. With such an arrangement the shoulder 70 would be spaced from the free edge 56 extending between adjacent tapered portions 76, and the periphery of the support plate 60 would be held by the shoulder and free edge, but would not be directly interposed between overlapping portions of the shoulder and free edge.

Figure 4:
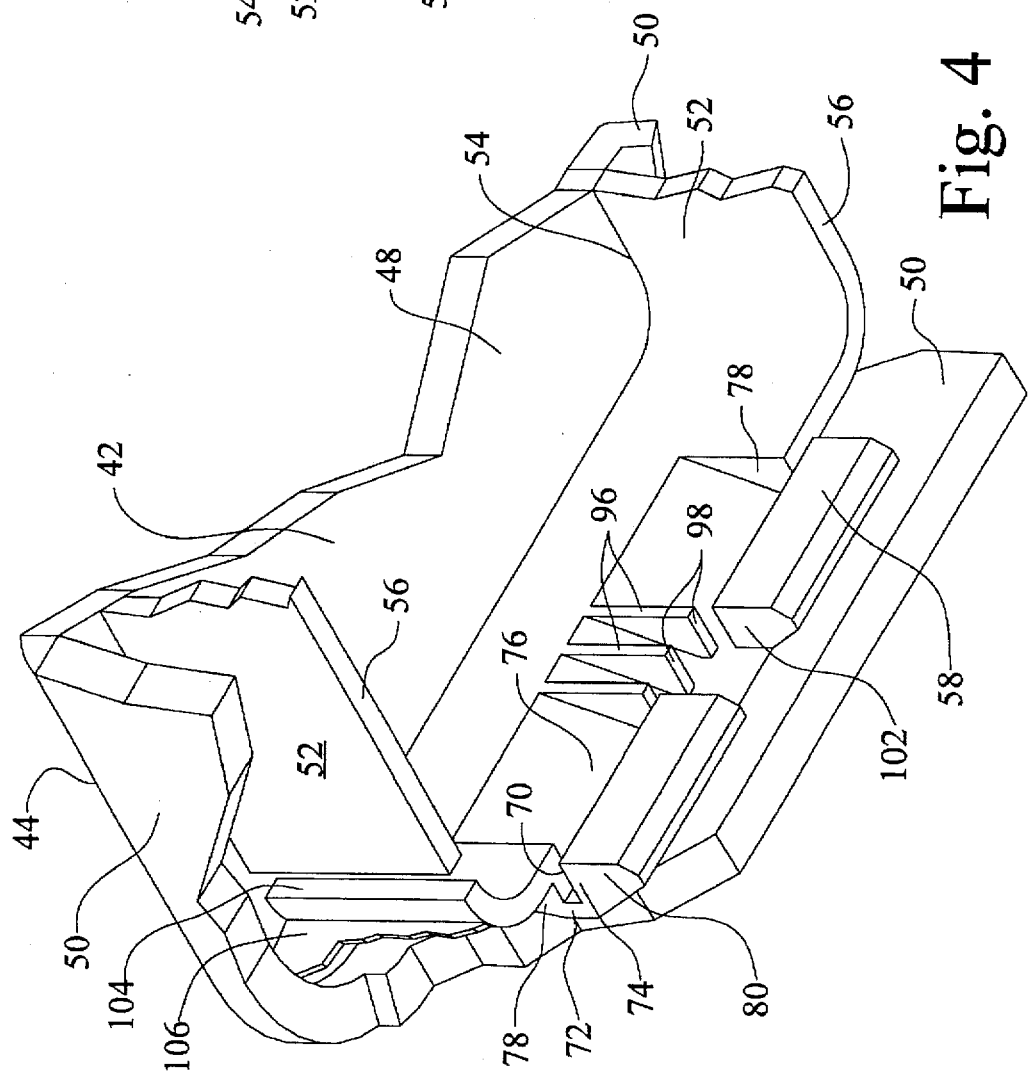
FIG. 4 is a front perspective view of the flap of FIG. 3.
Figure 5:
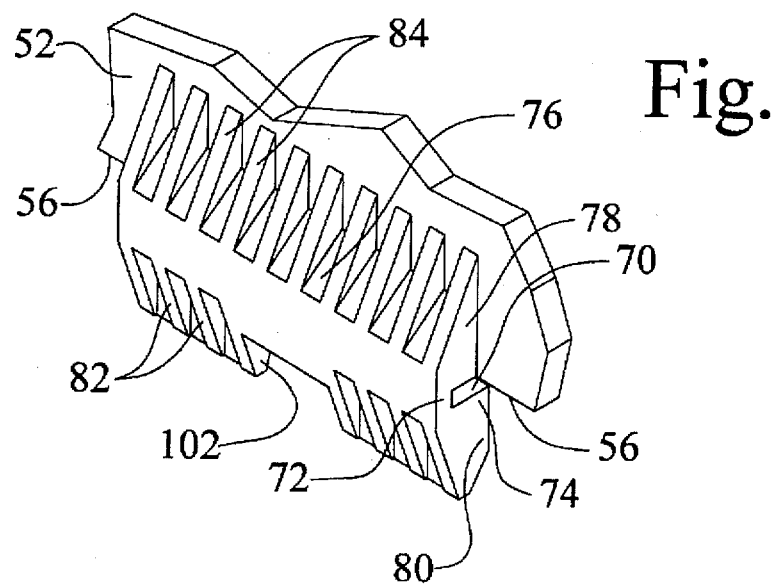
FIG. 5 is a rear perspective view of the flap of FIG. 3.

Alternatively, and as shown best in FIGS. 3 and 4, the peripheral length of the tapered portion 76 may be slightly less than that of the associated flap 58. With this arrangement small end portions of the shoulder 70 are directly opposed to the free edge 56 of the skirt. As such, in the assembled condition, the periphery of the support plate 60 will be directly interposed between the shoulder 70 and free edge 56 at the peripheral ends of the taper portion 76.

As may be envisioned, the shoulder 70 (i.e., foot section 74) and leg portion 72 of the mounting flaps 58, together with the free edge 56, are all that is required to hold the support plate 60 in position. However, to maneuver the support plate 60 into this position, typically by hand, it is necessary to move the foot section 74 radially outward to allow the flanges 68 to move past the foot section 74 into abutment with the free edge 56. To ease this movement, it is preferred that each flap include a foot extension 80 extending longitudinally downward from the foot section 74.

A worker may thus manually grasp the foot extension 80 to move it radially outward during mounting of support plate 60. During such assembly, the mounting flaps 58 must be sufficiently flexible to permit this movement, but after mounting of the support plate 60 is completed, the mounting flaps 58 must be sufficiently strong to hold the support plate 60 in position. To increase the stiffness of the mounting flaps 58 the desired mount, it may be desired to provide a plurality of flap ribs 82 extending between the longitudinal free end of the foot extension 80 and the end(s) of the foot section 74. In the embodiment shown, the foot extension 80 extends from the radially inner edge of the foot section 74, and as such, the flap ribs 82 extend only to the radially outer end of the foot section 74.

It is an important feature of the present invention that at least some of the flaps be tapered radially inward with increasing distance from the front face 42. In the present embodiment, this taper is provided by the flap ribs 82 extending between the foot extension 80 and the radially outer end of the foot section 74. This taper will be discussed again below.

It is noted that the flap ribs 82 extend longitudinally. This provides desired stiffening against flexure of the shoulder 70 longitudinally downward, but still permits flexure about the longitudinal axis. Further, forming the ribs longitudinally does not hinder parting of mold halves, should the cover 20 be injection molded. Specifically, the ribs form no surfaces which are opposed to (i.e., facing) the lower surface 48 of the front face 42.

This is not the case with shoulder 70, which by definition faces the surface 48. As such, to permit parting of a mold half which forms the notch shown in FIG. 2, it is necessary to form some portion of the mold as retractable radially. For the embodiment of FIG. 2, the retractable section would typically include the section which extends radially outward to form the notch (i.e., the volume bounded by end panels 78, taper portion 76 and foot section 74). After sufficient cooling of the injected plastic, the retractable mold section would move radially inward, permitting the mold half to move away from the front face 42.

It is also noted that the taper portion 76 extends radially outward, creating a face which is angled with respect to the front face. As such, this movement of the mold half away from the front face would also be opposed by the taper portion. However, the angled nature of the taper portion and the flexible nature of the cover would typically permit the taper portion 76 and skirt 52 to flex sufficiently to allow the mold half to be removed. Increasing the angle of the taper, perhaps with longitudinally oriented taper ribs 84, may make the needed flexure easier. Providing the angled surface to permit this flexure, and thus easier molding, is an important feature of the present module and cover.

From the above description, in conjunction with FIGS. 1 and 2, it may be seen that the cover, via the flaps 58, will be retained upon the support plate 60. To ensure that the flaps do not unintentionally disengage from the support plate 60, there is provided the retaining plate 62. These two plates work together to ensure that the cover is secured in place.

As best shown in FIG. 1, the retaining plate 62 is a generally planar piece of rigid material, preferably metal such as steel. The retaining plate 62 will typically include a central aperture 86 through which the inflator circular bottom wall 24 extends. The retaining plate 62 will also include a plurality of bolt holes (not shown) aligned with, and through which extend, the studs 38. The studs will receive nuts 88 thereon, and the nuts will abut against the bottom of the retaining plate 62, as best shown in FIG. 2.

The retaining plate 62 further includes a plurality of flap hooks 90. The number of flap hooks 90 will preferably equal the number of mounting flaps 58, but may be less. As best shown in FIG. 2, each of the hooks 90 at least includes an angled section 92 and preferably also includes a longitudinally extending end section 94. The end sections 94 are located on the retaining plate 62 such that, when assembled to the module, the end sections 94 will closely abut against the radially outer face of the flaps 58, typically at the leg portions 72. This abutment may be sufficiently tight that it will retain the retaining plate 62 to the flaps during assembly of the module.

The angled sections 92 of the hooks 90 will abut against the flaps 58, and are formed with a complimentary angle to that formed on the mounting flaps 58. As noted above, the formation of the taper on the flaps is an important aspect of the invention. It is this taper, and the angled sections 92 of the hooks, which serve to ensure a more secure attachment of the flaps 58 to the support plate 60.

Specifically, during assembly the tightening of the nuts 88 upon the studs 38 will cause the retaining plate 62 to move toward the support plate 60, with the flaps 58 retained therebetween. Due to the angle between the flaps 58 and the angled sections 92, there will be a camming effect which will tend to draw the flaps 58 radially inward. This inward movement of the flaps brings them into better engagement with the support plate 60. As such, the process of assembling the module serves to effect a better retention of the flaps.

The above-noted features of flap flexure to permit mold parting, and camming of the flaps to increase retention are not limited to the specific embodiment shown in FIGS. 1–5, but can be employed with other flap configurations. This is illustrated with a second embodiment, shown in FIG. 6.

This second embodiment will be identical with the first except in the formation of flaps 58'. Here, a leg portion 72' extends directly from the free edge 56' of a skirt 52', and the taper portion 76 is not present. A foot section 74' therefore extends radially inward of the leg portion and forms a shoulder 70' which engages against the underside of the support plate 60. Since the leg portion 7' is not offset radially from the skirt, the peripheral edge of the support plate 60 will be located radially inward of the free edge of the skirt, and can not rest thereupon. Alternatively, the periphery of the support plate 60 may simply include notches corresponding to and receiving the leg portions, with the remainder of the periphery extending radially outward and abutting against the free edge of the skirt, as in the first embodiment.

If the periphery of the support plate 60 is spaced radially inward of the skirt 52', it may be seen that the movement of the support plate 60 toward the front face 42 is not blocked. To prevent such movement, the skirt may be provided with blocker ribs 96' extending radially inward from the skirt 52'. The blocker ribs 96' will be longitudinally extending strips of material, preferably formed monolithically with the skirt 52'. A bottom face 98' of the blocker ribs 96' will be approximately level with the free edge 56' of the skirt 52', and will provide an abutment for the support plate 60. The blocker ribs 96' will thus prevent movement of the support plate 60 toward the front face 42.

The blocker ribs 96' may also be employed even if the support plate 60 includes notches at the flaps, and the remaining portion of the support plate periphery abuts against the free edge 56'. There are two reasons for this. First, the addition of more surfaces blocking movement toward the front face 42 will simply provide additional security against movement. Further, the blocker ribs 96' can be used to cause flexure for easier mold parting.

Figure 6:
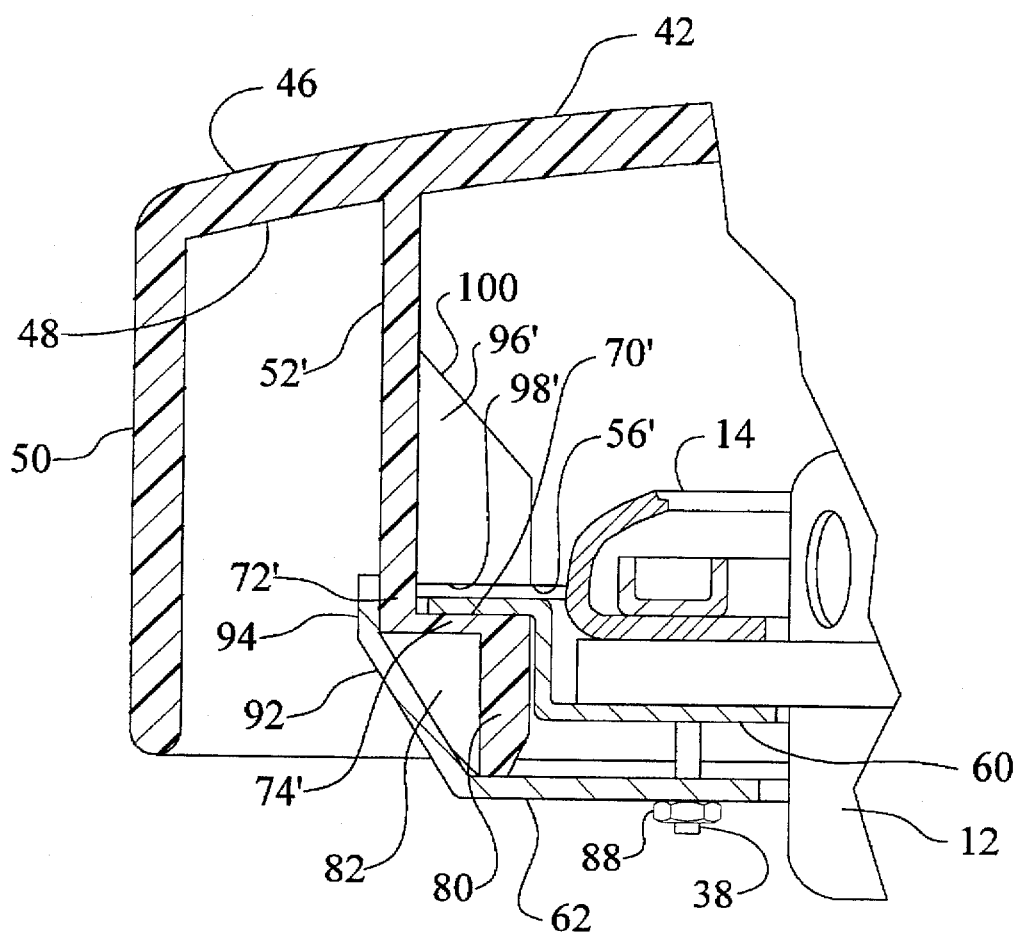
FIG. 6 is a cross-sectional side view, similar to that of FIG. 2, showing a second embodiment of a flap according to the present invention.

Specifically, even in this second embodiment the shoulder 70' blocks parting of a mold half, as described above. The formation of a retractable section on the mold may eliminate this problem. However, to ensure that parting is effected smoothly, upper ends 100 of the blocker ribs 96' may be tapered inward with increasing distance from the front face 42, as shown in FIG. 6. Thus any portion of the mold which would/end to interfere with the shoulder 70' would first abut against these upper ends 100. This would cause the skirt 52' to flex with further mold movement, permitting the mold to part without interference from the shoulder 70'.

The use of blocker ribs is not limited to the second embodiment. The taper portion 76 of the first embodiment may be provided with blocker ribs 96, best shown in FIG. 4. For this embodiment the ribs need not have tapered top ends, but the bottom face 98 will provide further abutment surfaces against movement of the support plate 60 toward the front face 42.

As may be seen, the drawing together of the two plates 60 and 62 causes the camming action which forces the flaps 58 into a fully engaged position. The manner in which these two plates are drawn together may of course vary, so long as the complimentary angled configuration is present to form the camming surfaces.

The only remaining assembly step not described is the mounting of the module to the vehicle. This will of course vary depending upon the vehicle, the location of the module, etc. For the driver side embodiment shown, the support plate 60 may include protruding mounting flats having bolt holes extending therethrough. Appropriate mounting bolts (not shown) could then secure the support plate 60 to the steering wheel. The other components of the module would thus be retained to the steering wheel through this attachment. The use of the blocker ribs 96 in this embodiment may coincide with any breaks in the ribs, such as discontinuity 102 required by the presence of the protruding mounting flats in the support plate 60. Other mounting arrangements are possible, such as fixing the retaining plate 62 to the steering wheel.

Various other modifications may be made to the cover and module of the present invention without departing from the basic concept. For example, the skirt 52 may include cutout sections 104 to increase its flexibility in some areas. This flexibility may be desirable to ease assembly of the flaps to the support plate 60. Alternatively or additionally, the cover may be provided with a reinforcing web 106 extending between the skirt 52 and peripheral wall 50, to increase stiffness of the skirt. As shown in the first embodiment, such cutout sections 104 and reinforcing webs 106 may even be used in close proximity to permit one section of the skirt 52 to be more easily flexed while not compromising the strength of the remaining portion of the skirt 52.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. An airbag module, comprising:

a cushion;

an inflator operatively associated with said cushion;

a cover having a front face overlying said cushion and defining a longitudinal axis, said cover including a skirt, said skirt including a free edge and a plurality of flaps extending longitudinally downward from said free edge, each of said flaps having a leg portion and a foot section extending radially inward from said leg portion, with each said foot section defining a shoulder opposed to said front face, each said foot section including a foot extension extending longitudinally downward therefrom, each said flap being tapered radially inward in a direction away from said front face;

a support plate having a peripheral edge interposed between said shoulders of said flaps and said front face; and a retaining plate having a plurality of flap hooks, each associated with one of said flaps, and each of said flap hooks including an angled section having an angle complimentary to that of the associated one of said flaps, each said angled section defining a camming surface moving an associated one of said flaps radially inward with movement of said retaining plate toward said support plate.

2. A module as in claim 1, wherein said flap hooks are equal in number to said flaps.

3. A module as in claim 1, wherein each said leg portion is located radially exterior of said skirt, and a radially interior end of each said foot section is substantially aligned with said skirt, and further including a taper portion extending between each said leg portion and said skirt.

4. A module as in claim 3, further including a plurality of longitudinally extending taper ribs on a radially exterior face of said taper portion.

5. A module as in claim 4, wherein said cover front face, skirt, flaps and ribs are a monolithic unit.

6. A module as in claim 3, further including a plurality of blocker ribs on a radially interior face of said taper portion, each of said ribs having a bottom face opposed to said support plate.

7. A module as in claim 3, wherein each said foot extension extends from a radially interior end of an associated one of said foot sections, and further including a plurality of flap ribs extending between each said foot section and said associated foot extension, said flap ribs forming said radially inward taper of said flaps.

8. A module as in claim 1, wherein said leg portions are substantially aligned with said skirt, and radially interior ends of said foot sections extend radially interior of said skirt.

9. A module as in claim 8, further including a plurality of blocker ribs on a radially interior face of said skirt, each said blocker rib having a bottom face opposed to an associated one of said foot sections.

10. A module as in claim 9, wherein upper ends of said blocker ribs are tapered radially inward in a direction away from said front face.

11. A module as in claim 8, wherein each said foot extension extends from a radially interior end of an associated one of said foot sections, and further including a plurality of flap ribs extending between each said foot section and said associated foot extension, said flap ribs forming said radially inward taper of said flaps.

12. A cover for an airbag module, comprising:

a front face having a periphery, and defining a longitudinal axis;

a skirt extending longitudinally downward from said front face, said skirt including a free edge;

a plurality of flaps extending longitudinally downward from said free edge, each of said flaps having a leg portion and a foot section extending radially inward from said leg portion, with each said foot section defining a shoulder opposed to said front face, each said foot section including a foot extension extending longitudinally downward therefrom, each said flap being tapered radially inward in a direction away from said front face.

13. A cover as in claim 12, wherein each said leg portion is located radially exterior of said skirt, and a radially interior end of each said foot section is substantially aligned with said skirt, and further including a taper portion extending between each said leg portion and said skirt.

14. A cover as in claim 13, further including a plurality of longitudinally extending taper ribs on a radially exterior face of said taper portion.

15. A cover as in claim 14, wherein said cover front face, skirt, flaps and ribs are a monolithic unit.

16. A cover as in claim 13, further including a plurality of blocker ribs on a radially interior face of said taper portion, each of said ribs having a bottom face in spaced parallel relation to said shoulders.

17. A cover as in claim 13, wherein each said foot extension extends from a radially interior end of an associated one of said foot sections, and further including a plurality of flap ribs extending between each said foot section and said associated foot extension, said flap ribs forming said radially inward taper of said flaps.

18. A cover as in claim 12, wherein said leg portions are substantially aligned with said skirt, and radially interior end of said foot sections extend radially interior of said skirt.

19. A cover as in claim 18, further including a plurality of blocker ribs on a radially interior face of said skirt, each said blocker rib having a bottom face opposed to an associated one of said foot sections.

20. A cover as in claim 19, wherein upper ends of said blocker ribs are tapered radially inward in a direction away from said front face.

21. A cover as in claim 18, wherein each said foot extension extends from a radially interior end of an associated one of said foot sections, and further including a plurality of flap ribs extending between each said foot section and said associated foot extension, said flap ribs forming said radially inward taper of said flaps.

* * * * *